Figure 1:
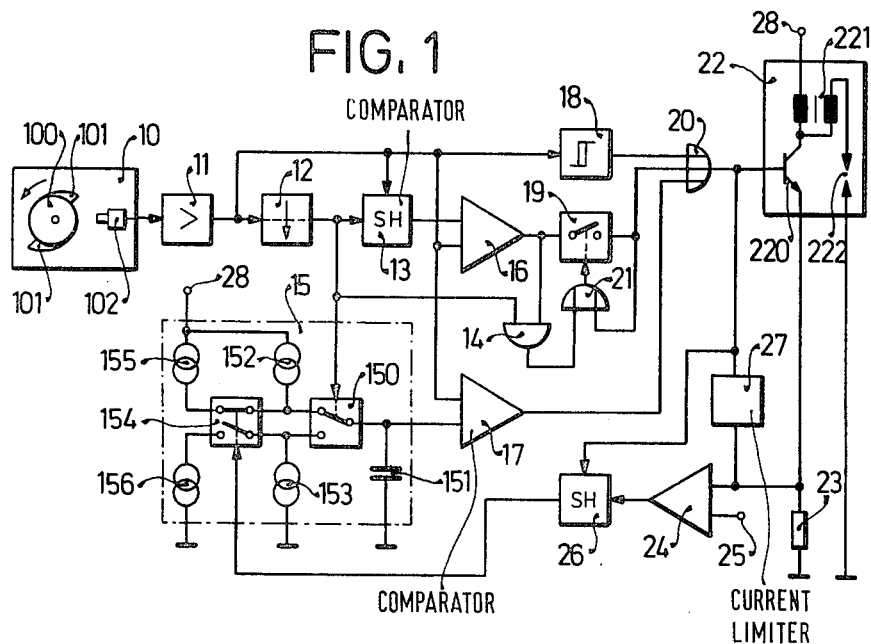

United States Patent [19]

Hohne et al.

[11] 4,267,813

[45] May 19, 1981

[54] IGNITION SYSTEM WITH AUTOMATIC INCREASE IN IGNITION ENERGY DURING ACCELERATION

[75] Inventors: Gerd Hohne, Ludwigsburg; Gerhard Sohner, Remshalden, both of Fed. Rep. of Germany

[73] Assignee: Robert Bosch GmbH, Stuttgart, Fed. Rep. of Germany

[21] Appl. No.: 16,509

[22] Filed: Mar. 1, 1979

[30] Foreign Application Priority Data

Mar. 21, 1978 [DE] Fed. Rep. of Germany ....... 2812291

[51] Int. Cl.³ .............................................. F02P 3/04
[52] U.S. Cl. ................... 123/609; 123/625; 123/644
[58] Field of Search ............ 123/117 R, 117 D, 148 E

[56] References Cited

U.S. PATENT DOCUMENTS

| Re. 29,862 | 12/1978 | Roozenbeek et al. | 123/148 E |
|---|---|---|---|
| 3,797,471 | 3/1974 | Schuette | 123/148 E |
| 4,043,302 | 8/1977 | Sessions | 123/117 R |
| 4,064,859 | 12/1977 | Kashiwazaki | 123/148 E |
| 4,106,440 | 8/1978 | Lai et al. | 123/148 E X |
| 4,117,819 | 10/1978 | Jarrett et al. | 123/148 E |

Primary Examiner—Tony M. Argenbright
Attorney, Agent, or Firm—Frishauf, Holtz, Goodman & Woodward

[57] ABSTRACT

When the engine accelerates, the angle over which the ignition switch is closed prior to initiating the spark is automatically increased. Acceleration of the engine is detected by a comparator which compares the value of a speed-dependent signal in sequential cycles and initiate closure of the ignition switch if a predetermined difference is exceeded between the so-compared signals at a predetermined time in the cycle. Under static or decelerating conditions, the speed-dependent signal is compared, in each cycle, to the output of an integrator circuit. The integrator circuit integrates in a first direction at a first rate up to the above-mentioned predetermined time in the cycle and in the opposite direction at a second predetermined rate for the remainder of the cycle. The average value of the integrator output signal corresponds to the engine speed. When the so-compared signals are equal, the second comparator furnishes an output signal which closes the ignition switch. The integrating rates may be varied as a function of operating parameters of the engine.

10 Claims, 2 Drawing Figures

IGNITION SYSTEM WITH AUTOMATIC INCREASE IN IGNITION ENERGY DURING ACCELERATION

Cross-reference to related applications and publications:

DE-OS No. 2 244 781=U.S. Pat. No. 3,881,458

German Patent applications Nos. 2 726 132.1 and 2 7030 309.9

DE-AS No. 2 124 310=U.S. Pat. No. 3,605,713

The present invention relates to ignition systems and, in particular, to ignition systems used in internal combustion engines.

BACKGROUND AND PRIOR ART:

German publication DE-OS No. 2 244 781 discloses an ignition system wherein the closure angle of the switch in series with the ignition coil varies as a function of engine speed. During acceleration, the closure angle changes steadily and, in particular, the speed information during a particular ignition cycle serves to correct the closure angle in the next subsequent cycle. This delay of one cycle in correcting the closure angle can lead to decreased ignition energy when very rapid accelerations occur. This of course is undesirable.

THE INVENTION:

In accordance with the present invention, means are provided for furnishing an acceleration signal upon acceleration of a rotating member of the engine. This acceleration signal causes an immediate increase in the closure angle. Preferably, the immediate increase is to the maximum value of the closure angle which is limited only by the fact that the switch in series with the ignition coil must remain open for a predetermined minimum open time. This increase to the maximum value may cause the current through the ignition coil to exceed the required value or, when current limiting circuits are in operation to flow for too long a time, but this is an acceptable price to pay for the fact that sufficient ignition energy will be present. The latter of course is particularly important during acceleration processes.

In a particularly preferred embodiment the means for furnishing an acceleration signal comprises means for furnishing cyclically recurring speed signals each indicative of the rotational speed of a rotating member of the engine and means for comparing sequential ones of said speed signals to each other and furnishing the acceleration signal when the difference between so-compared signals exceeds a predetermined difference. If the cyclically recurring speed signal is a ramp voltage which starts when an engine shaft is in an angular reference position a timing signal generator is provided which furnishes an interval signal (pulse) extending over a predetermined time interval following the start of the ramp signal. The trailing edge of the interval signal is a timing signal which causes storing of the then-present value of the ramp function and comparison with the corresponding value stored in the previous operating cycle.

In a further preferred embodiment the means for increasing the closure angle of the ignition switch means comprises means for switching the ignition switch means to the conductive state immediately in response to the acceleration signal.

The present invention also provides for operation during static or deceleration conditions. For this purpose, an integrating circuit is provided which integrates in one direction during the above-mentioned time interval and in another direction during the remainder of the cycle. A comparator compares the integrator output signal to the cyclically recurring speed signal and furnishes a comparator output signal which closes the ignition switch means when the so-compared inputs are equal. This type of circuit allows very easy control of the closure angle under different operating conditions, since the integration time constants can readily be changed. In the preferred embodiment, this change of integration time constants is a function of a current control circuit which controls the current through the ignition coil. Other parameters of the internal combustion engine can of course equally well be used.

DRAWING DESCRIBING A PREFERRED EMBODIMENT

Figure 2:
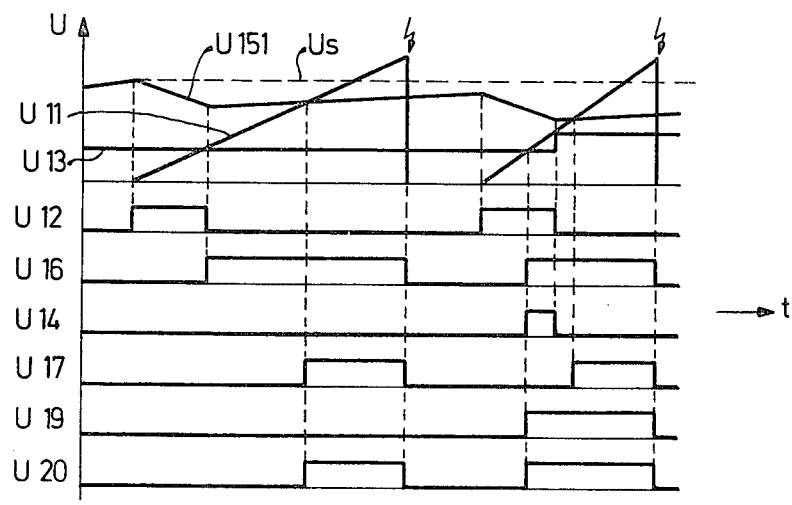

FIG. 1 is a circuit diagram of a preferred embodiment of the present invention; and FIG. 2 shows the variation with respect to time of the voltage at various points in the circuit of FIG. 1.

In FIG. 1, a disk 100 mounted on a rotating shaft of the engine, for example the crankshaft, has segments 101 and 102 which cause the generation of a linearly increasing voltage when rotating past transducer 102. Transducer 102 may, for example, be a Hall element. Such ramp signal generators are described in the cross-referenced patent applications. The output of transducer 102 is connected to the input of a linear amplifier 11 which, preferably, is a difference amplifier. The output of difference amplifier 11 is connected to the trigger input of a timing element 12. In a preferred embodiment timing element 12 is a monostable multivibrator which is switched to the unstable state by a signal applied at the trigger input.

The output of monostable multivibrator 12 is connected to the store control input of a sample-and-hold circuit 13 and to one input of an AND gate 14 as well as to the control input of an integrating circuit 15. The output of sample-and-hold circuit 13 is connected with one input of a first comparator 16 whose second input is connected to the output of difference amplifier 11. The output of difference amplifier 11 is further connected to a data input of sample-and-hold circuit 13, one input of a second comparator 17 and one input of a pulse forming stage 18 which may, for example, be a Schmitt trigger circuit. The output of comparator 16 is connected to a gate or switching stage 19 (e.g. a transistor), to one input of a first OR gate 20 and to one input of a second OR gate 21. The output of comparator 16 is connected via an AND gate 14 to the second input of second OR gate 21. The output of OR gate 21 is connected to the control input of switching stage 19. Further inputs of OR gate 20 are connected to the output of pulse former stage 18 and second comparator 17. The output of OR gate 20 is connected to the control input of an ignition output stage 22. The latter is well known and comprises a power transistor 220 connected in series with the primary winding of an ignition coil 221 whose secondary circuit includes a spark-producing member 222, e.g. a spark plug. If necessary, power amplifiers may be connected in front of stage 22.

Since such output stages are well known, they will not be discussed in further detail here. A current measuring resistor 23 is connected in the primary circuit of ignition coil 221. The voltage across resistor 23 is applied to one input of a comparator 24 to whose second input, 25, a reference voltage is applied. The output of comparator 24 is connected to a second sample-and-hold circuit 26 whose store control input is connected to the output of OR gate 20. Such sample-and-hold circuits store the level of a signal applied at the data input at the time of receipt of the store control signal. They are described, for example, in the book "Electronic Circuits Manual," John Markus, McGraw Hill Company 1971 Chapter 74, pages 689 ff. A current limiting stage 27 described, for example, in DE-AS 2 124 310, is connected in parallel to the base-emitter circuit of power transistor 220. The current limiting circuit limits the amplitude of the current through the primary winding in order to eliminate unnecessary power losses.

The integrating stage 15 includes a first switch 150 whose control input is connected to the output of timing circuit 12. When switch 150 is in the position shown, a current source 152 is connected in series with a capacitor 151. Specifically, current source 152 and capacitor 151 form a series circuit between a terminal 28 which carries the positive supply voltage and ground or chassis potential. In the second position of switch 150 the current source 152 is disconnected from the capacitor and a discharge circuit 153 is connected in parallel with capacitor 151. The side of capacitor 151 which is not connected to ground potential is connected to a further input of second comparator 17. A second switching arrangement 154, whose control input is connected to the output of sample-and-hold circuit 26, causes a second current source 155 to be connected in parallel to the current source 152. In the second position of switching stage 154 an additional discharge circuit 156 is connected in parallel with circuit 153.

OPERATION:

Referring also to FIG. 2, it will be noted that a linearly increasing voltage U11 is generated at the output of difference amplifier 11. Since the end values of U11 are always the same and since the increase from the starting to the final value takes place while disk 100 rotates through a predetermined angle, the slope of signal U11 will vary as a function of the rotational speed of disk 100. Of course the ramp signal generator 10 could be replaced by other speed-voltage transducers as, for example, an inductive sensor, an optical sensor, or a Wiegand sensor, the ramp function then being generated electronically as, for example, by an integrating circuit.

At the start of voltage U11, timing circuit 12 is triggered causing the signal U12 to appear at its output. Signal U12 controls switch 150. Specifically, switch 150 is in the position shown in the drawing namely the position connecting current source 152 to capacitor 151 in the absence of signal U12 and is in the other position connecting discharge circuit 153 to capacitor 151 in the presence of signal U12. The voltage across capacitor 151 thus alternately increases and decreases. On the average the voltage across capacitor 151 is, however, a speed proportional voltage. Speed proportional voltage 151 is compared in comparator 17 to voltage U11. When voltage U11 exceeds voltage U151, comparator 17 furnishes a comparator output signal U17 which causes transistor 220 to close. The output signal U17 therefore determines the closure angle at the end of which ignition occurs.

The speed proportional voltage U151 is modified by a current regulating factor. The voltage across resistor 23 is proportional to the current flowing through ignition coil 221. If the voltage across resistor 23 exceeds the voltage applied at terminal 25, a comparator output signal appears at the output of comparator 25. At the ignition time, that is in response to the trailing edge of the output pulse of OR gate 20, the signal then at the output of comparator 24 is stored in sample-and-hold circuit 26. The output of sample-and-hold circuit 26 then controls the position of switch 154 during the next cycle. Specifically, when a "1" signal is stored in sample-and-hold circuit 26, that is when the current through resistor 23 exceeded the prescribed value, the additional current source 155 is connected in parallel with source 152. If the current did not reach the specified value, the "0" output signal of comparator 24 is stored in sample-and-hold circuit 26 and causes switch 154 to disconnect current source 155 from capacitor 151 and instead connect discharge circuit 156 in parallel to circuit 153. In the first case, the voltage U151 is increased causing a shortening of signal U17. In the second case, signal U17 is stretched.

Switch 154 can also be controlled by other operating parameters of the internal combustion engine in order to control the closure angle of switch 220 as a function of such parameters. To increase the closure angle when the internal combustion engine accelerates, the value of signal U11 which exists at the end of a predetermined time interval, namely the time at which singal U12 changes from a "1" to a "0" signal is stored in sample-and-hold circuit 13. In the following cycle the stored signal in sample-and-hold circuit 13 is compared to the then-present voltage U11 in comparator 16. The output of comparator 16 is shown as voltage U16 in FIG. 2. In the first cycle of FIG. 2, the static case is shown, for which the stored voltage U13 is the same as voltage U11 at the time of the trailing edge of signal U12. Since signal U12 and U16 are therefore not present simultaneously, switching circuit 19 remains open since AND gate 14 furnishes a "0" signal, causing the output of OR gate 21 to be a "0." Signal U19 is therefore a "0" signal.

In the second cycle an acceleration is indicated by the fact that signal U11 has a higher rate of change with respect to time. Voltage U11 exceeds voltage U13 prior to the trailing edge of signal U12. A "1" signal therefore appears at the output of AND gate 14. This signal causes switching stage 19 to become conductive and signal U16 at the output of comparator 16 is taken over as signal U19 at the output of stage 19. Since the output of stage 19 is applied to its control input through OR gate 21, stage 19 is maintained in the conductive state for the duration of signal U16. In response to the trailing edge of signal U12 the new higher voltage value is stored in sample-and-hold circuit 13 as voltage U13.

The threshold value of comparator 16 can be so adjusted that comparator 16 only responds when signal U11 exceeds voltage U13 by a predetermined amount. This is to prevent the closure angle from being adjusted to a fixed value for small accelerations. The fixed value of the closure angle should only occur when the acceleration of the engine exceeds a predetermined minimum acceleration.

Logic circuits 14, 19 and 21 at the second input of comparator 16 can be replaced by a second sample-and-hold circuit so that two sample-and-hold circuits, one connected to each input of comparator 16 would be used. The signal U11 stored in the second sample-andhold circuit would be the value of signal U11 in the next subsequent cycle. This type of circuit would have the same effect as the illustrated circuit. By the interval timed by timing circuit 12, a minimum open time for switch 220 can be set indirectly. During accelerations, the open time corresponds to the time interval (pulse width) of signal U12 decreased by a value which is a function of the maximum possible acceleration. By supplying a subtracting stage, subtracting signal U14 from signal U19 prior to connecting signal U19 to OR gate 20, the minimum time during which switch 220 will remain open can be set directly by signal U12. Such a subtraction circuit could, for example, be an exclusive OR gate inserted in line 19a in FIG. 1 and having a first input connected to the output of stage 19, a second input connected to the output of AND gate 14 and an output connected to the center input of OR gate 20 as shown in FIG. 1.

A minimum closure angle can be set by means of pulse shaping stage 18. The threshold of stage 18 is designated as $U_s$. When voltage U11 reaches value $U_s$ and the output signals of stage 19 and stage 17 are both "0" signals, then the closure angle is initiated by signal U17. The ignition time, that is the end of the closure angle, is fixed by resetting of voltage U11.

A digital embodiment of the present invention is also possible. In this case the ramp signal is created by an increment counter, that is stage 10 furnishes pulses for each incremental angular rotation of the shaft and these pulses are counted by a counter which is reset in response to a reference mark. The sample-and-hold circuits are replaced by buffer storages and the analog comparators are replaced by digital comparators. The integrator stage is replaced by a digital counter which counts up or down at different frequencies depending upon positions of switches 150 and 154.

Various changes and modifications may be made within the scope of the inventive concepts.

We claim:

1. In an internal combustion engine having a rotating member (100), means (221, 222) for producing a spark upon interruption of current therethrough, ignition switch means (220) connected to said spark producing means and having a first and second stable state for, respectively, allowing and blocking current flow through said spark producing means, and switch control means for maintaining said ignition switch means in said first state for a desired closure angle of rotation of said rotating member immediately preceding said production of said spark, the improvement comprising
    means (12, 13, 14, 16) for furnishing an acceleration signal upon acceleration of said rotating member, said means comprising,
    means for furnishing cyclically recurring speed signals each indicative of the rotational speed of said member, and means (16) for comparing sequential ones of said speed signals to each other and furnishing said acceleration signal when the difference between so-compared signals exceeds a predetermined difference; and
    means (19, 20, 21) connected to said acceleration signal furnishing means for abruptly increasing said desired closure angle to an increased closure angle in response to said acceleration signal, whereby sufficient energy for producing a spark is available in said spark producing means even during acceleration of said engine.

2. In an internal combustion engine as set forth in claim 1, wherein said increased closure angle is the maximum possible closure angle of said ignition switch means.

3. An internal combustion engine as set forth in claim 1, wherein said rotating member starts each of said cycles in a reference position;
    wherein said means for generating cyclically recurring speed signals comprises means for furnishing a time-varying signal having a slope varying in dependence on said rotary speed starting when said member is in said reference position, means for furnishing a timing signal at a predetermined time interval following said start of said time-varying signal, and sample-and-hold means (13) connected to said timing signal furnishing means and said time-varying signal furnishing means for storing the value of said time-varying signal in response to said timing signal thereby furnishing a stored signal; and
    wherein said comparator means comprises means for comparing said stored signal to the value of said time-varying signal at a corresponding time in the next subsequent cycle and furnishing a comparator output signal only when the difference between so-compared signals is greater than said predetermined difference, and logic circuit means (14) connected to said timing signal furnishing means and said comparator means for furnishing said acceleration signal only when said comparator output signal is furnished before said timing signal.

4. An internal combustion engine as set forth in claim 3, wherein said means for abruptly increasing said desired closure angle comprises means for switching said ignition switch means into said first state in response to said acceleration signal.

5. An internal combustion engine as set forth in claim 4, wherein said ignition switch means must remain in said second stable state for at least a predetermined minimum open time; and wherein said predetermined time interval constitutes said predetermined minimum open time.

6. An internal combustion engine as set forth in claim 1, wherein said means for furnishing cyclically recurring speed signals comprises ramp signal generator means (101, 102) having a first element coupled to said rotating member for rotation therewith and transducing means mounted in operative proximity of said first member for furnishing said ramp signal when said first member rotates past said transducing member.

7. In an internal combustion engine having a rotating member (100), cyclically operable means (221) for producing a spark, ignition switch means (220) connected to said spark producing means for allowing current to flow through said spark producing means during a closure time and interrupting said current flow through said spark producing means at the end of said closure time, thereby producing said spark, apparatus for varying said closure time in each of said cycles as a function of angular speed of said rotating member, comprising
    means (11) coupled to said rotating member for furnishing a cyclically recurring time varying signal starting when said rotating member passes a reference position;
    means (12) for furnishing a time interval signal throughout a first predetermined time interval following the start of said cyclically recurring time varying signal;

means (15) for furnishing a reference signal having an average value proportional to the angular speed of said rotating member comprising;

integrator means (151), first control means (152) for controlling said integrator means to integrate at a first predetermined rate in a first predetermined direction, second integrator control means (153) for controlling said integrator means to integrate at a second integration rate in a direction opposite to said first predetermined direction, and switch means (150) for connecting said first control means to said integrator means in the presence of said interval signal and said second control means to said integrator means in the absence of said interval signal;

and comparator means connected to said reference signal furnishing means, said cyclically recurring time varying signal furnishing means and said ignition switch means for comparing said cyclically recurring time varying signal to said reference signal and furnishing a comparator output signal when a predetermined relationship exists between the so-compared signals;

and means (20) for initiating said closure time in response to said comparator output signal.

8. An internal combustion engine as set forth in claim 7, wherein said comparator means furnishes said comparator output signal when said cyclically recurring time varying signal is equal to said reference signal.

9. An internal combustion engine as set forth in claim 7, further comprising means (154–156) for varying at least one of said first and second integration rates as a function of a selected operating parameter of said internal combustion engine.

10. An internal combustion engine as set forth in claim 9, wherein said selected operating parameter is the rate of rise of ignition current in the last preceding cycle of said internal combustion engine.

* * * * *